US012616987B2

(12) United States Patent
Ezzina et al.

(10) Patent No.: US 12,616,987 B2
(45) Date of Patent: May 5, 2026

(54) HEAD FOR DISPENSING A FLUID PRODUCT AND ASSOCIATED FLUID PRODUCT BOTTLE

(71) Applicant: SILGAN DISPENSING SYSTEMS LE TRÉPORT, Le Treport (FR)

(72) Inventors: Emir Ezzina, Montigny-le-Bretonneux (FR); Richard Bloc, Derchigny-Graincourt (FR); Thomas Pruvost, Yzengremer (FR)

(73) Assignee: Silgan Dispensing Systems Le Treport, Le Treport (FR)

( * ) Notice: Subject to any disclaimer, the term of this patent is extended or adjusted under 35 U.S.C. 154(b) by 176 days.

(21) Appl. No.: 18/713,921

(22) PCT Filed: Nov. 24, 2022

(86) PCT No.: PCT/EP2022/083203

§ 371 (c)(1),
(2) Date: May 28, 2024

(87) PCT Pub. No.: WO2023/094558

PCT Pub. Date: Jun. 1, 2023

(65) Prior Publication Data

US 2025/0025902 A1 Jan. 23, 2025

(30) Foreign Application Priority Data

Nov. 29, 2021 (FR) ...................................... 2112627

(51) Int. Cl.
*B05B 11/10* (2023.01)

(52) U.S. Cl.
CPC ...... *B05B 11/1053* (2023.01); *B05B 11/1039* (2023.01); *B05B 11/1074* (2023.01)

(58) Field of Classification Search
CPC ............. B05B 11/1053; B05B 11/1039; B05B 11/1074; B05B 15/50; B65D 83/164
See application file for complete search history.

(56) References Cited

U.S. PATENT DOCUMENTS 3,991,916 A * 11/1976 Del Bon .............. B65D 83/164 222/494
5,785,208 A * 7/1998 Dobbs ................. B05B 11/1053 222/321.2

(Continued)

FOREIGN PATENT DOCUMENTS

| | | |
|---|---|---|
| EP | 0800870 | 10/1997 |
| FR | 2277002 | 1/1976 |
| FR | 3078061 | 8/2019 |

*Primary Examiner* — Donnell A Long
(74) *Attorney, Agent, or Firm* — Hinckley Allen & Snyder; Stephen Holmes

(57) ABSTRACT

Dispensing head (2) of a fluid product comprising:

a manually actuable pusher (5) in relation to an insert,
an elastic dispensing nozzle (10).

When the pusher (5) is moved, the nozzle (10) switches from a closed position to an open position by deformation of the nozzle (10) under the effect of a release of a stress exerted by the pusher (5). The pusher (5) comprises a stop (54) and the insert (6) is provided with two deformable lugs (60) which cause a force on the pusher (5) such that the insert (6) exerts on the nozzle (10) a stress in the opposite direction to a stress exerted by the stop (54) on the nozzle (10), each lug (60) extending from a body (6*a*) of the insert (6) and having a distal end (60*a*) of the body, the said ends being surmounted and connected to each other by a connecting element 70.

17 Claims, 7 Drawing Sheets

(56) References Cited

U.S. PATENT DOCUMENTS

| | | | | |
|---|---|---|---|---|
| 2010/0147898 | A1 | 6/2010 | Blumenstein | |
| 2023/0034207 | A1 * | 2/2023 | Zandonà | F04B 43/0009 |
| 2023/0219109 | A1 * | 7/2023 | Pruvost | B05B 11/1054 222/402.13 |
| 2023/0311144 | A1 * | 10/2023 | Knight | B05B 11/1074 |

* cited by examiner

[Fig. 1a]
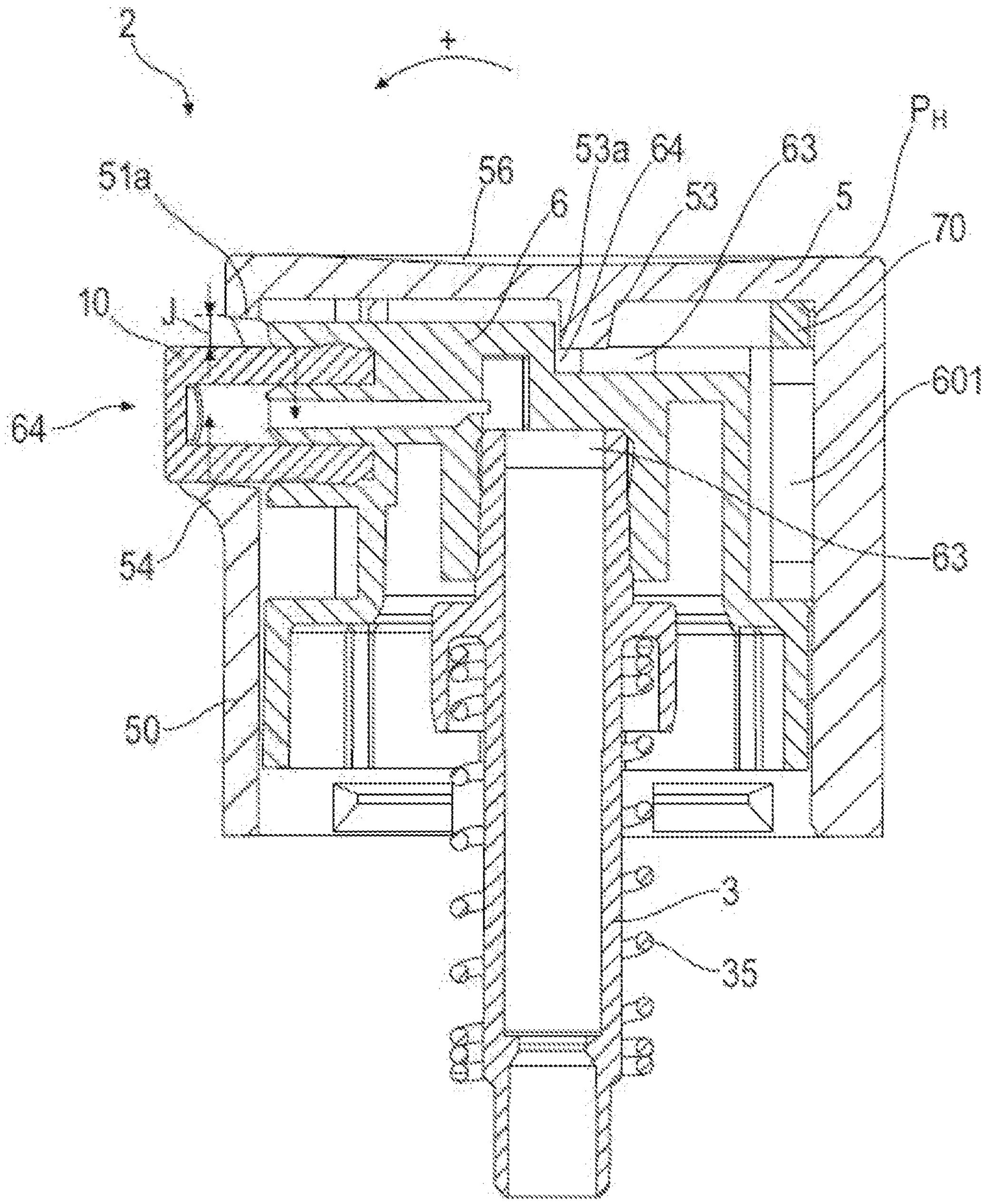

[Fig. 1b]
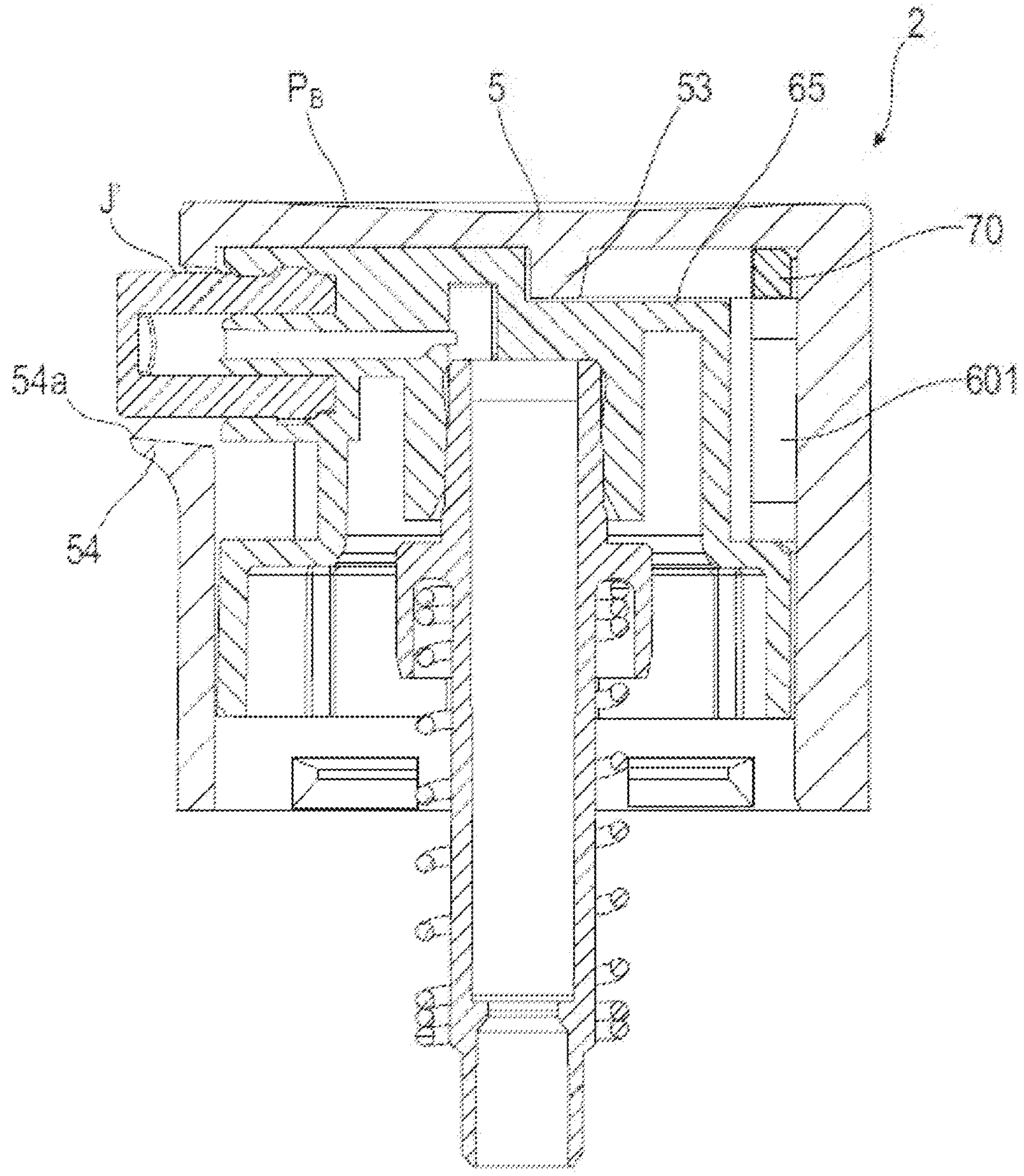

[Fig. 2a]
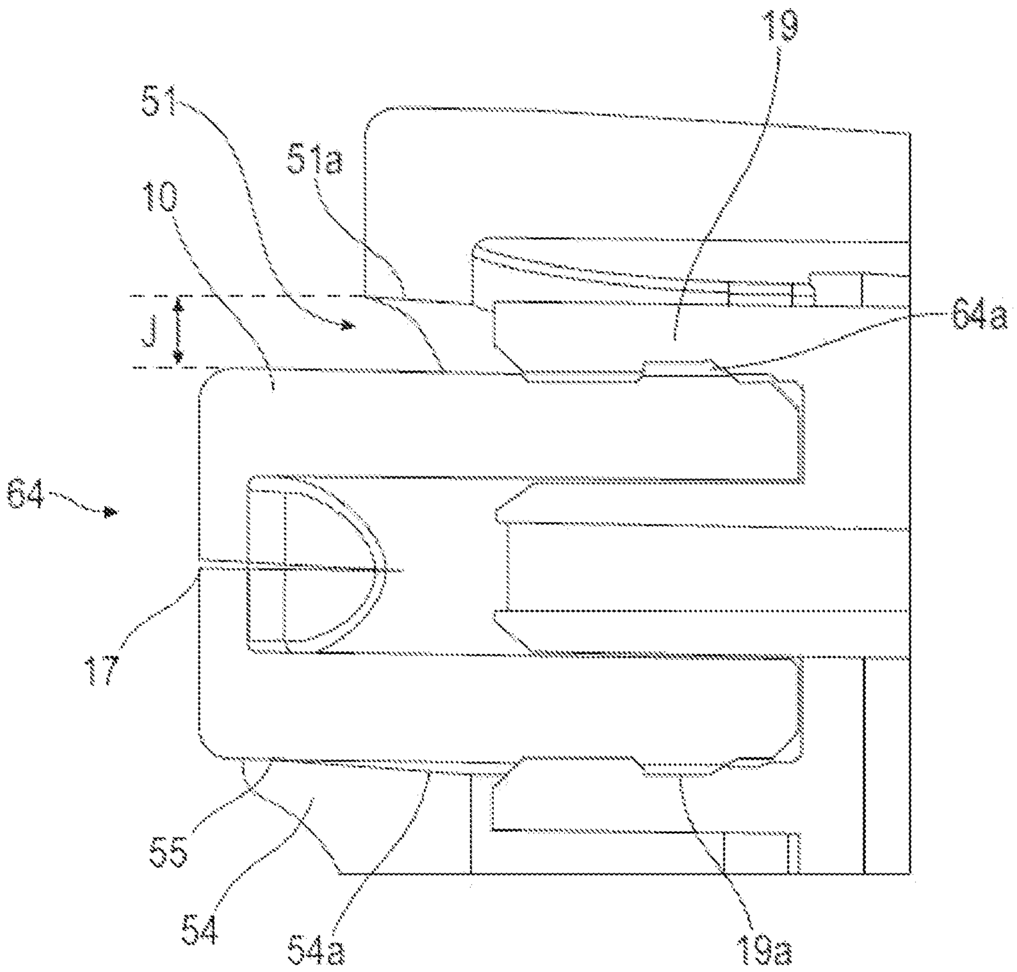
[Fig. 2b]
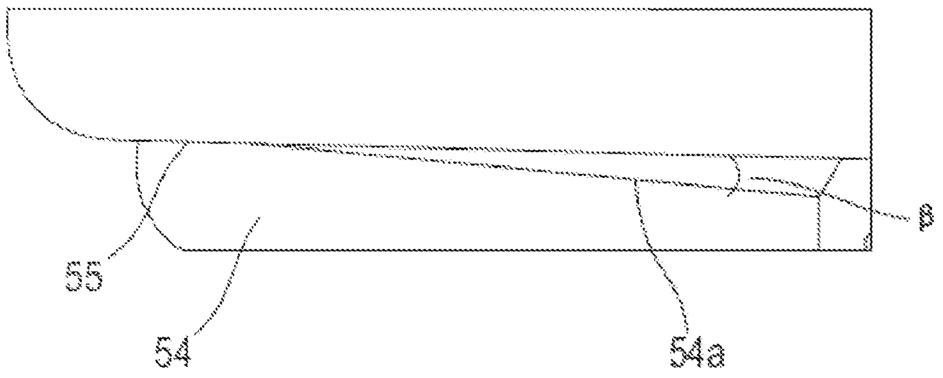

[Fig. 3a]
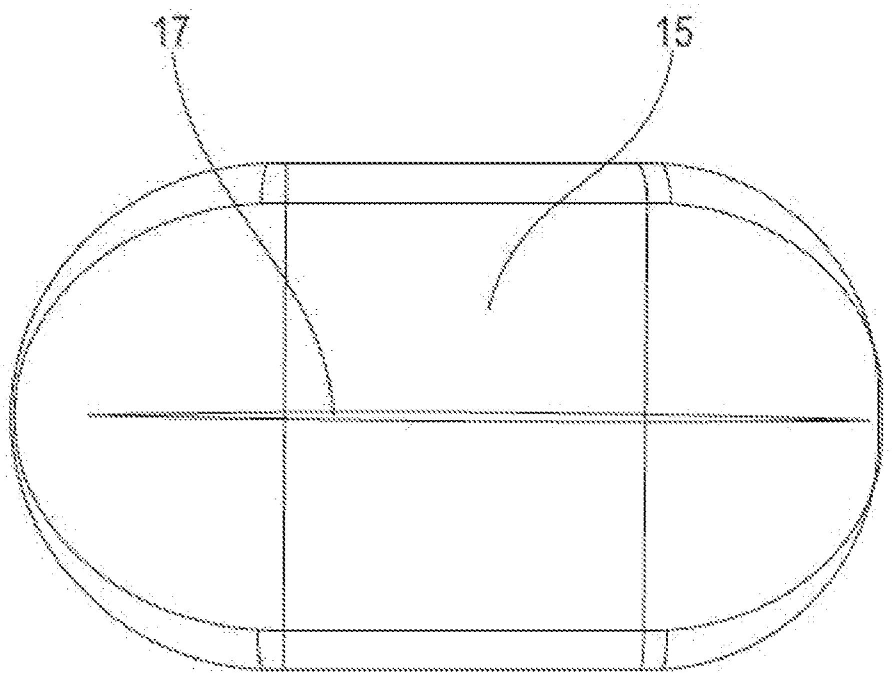
[Fig. 3b]
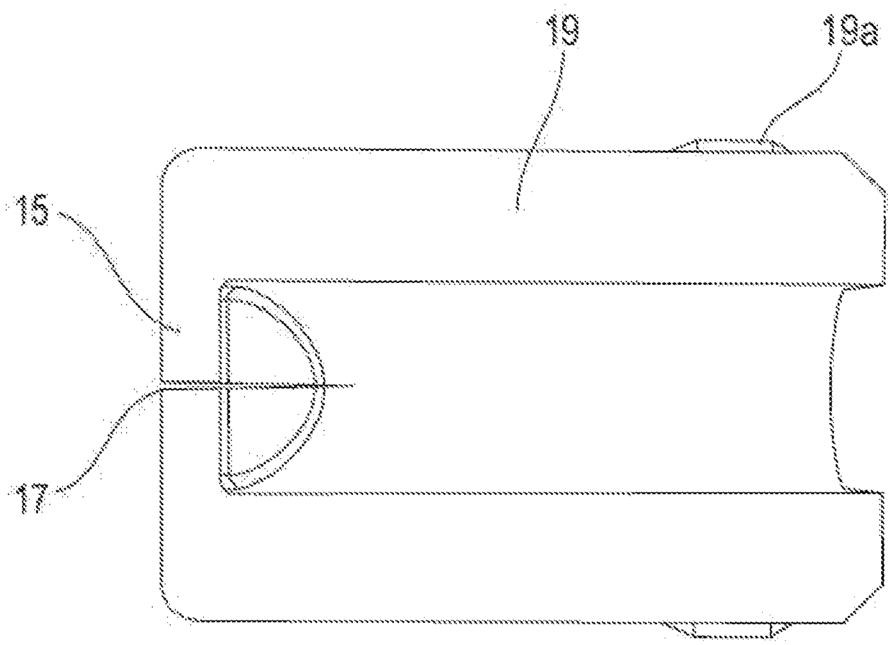

[Fig. 4a]
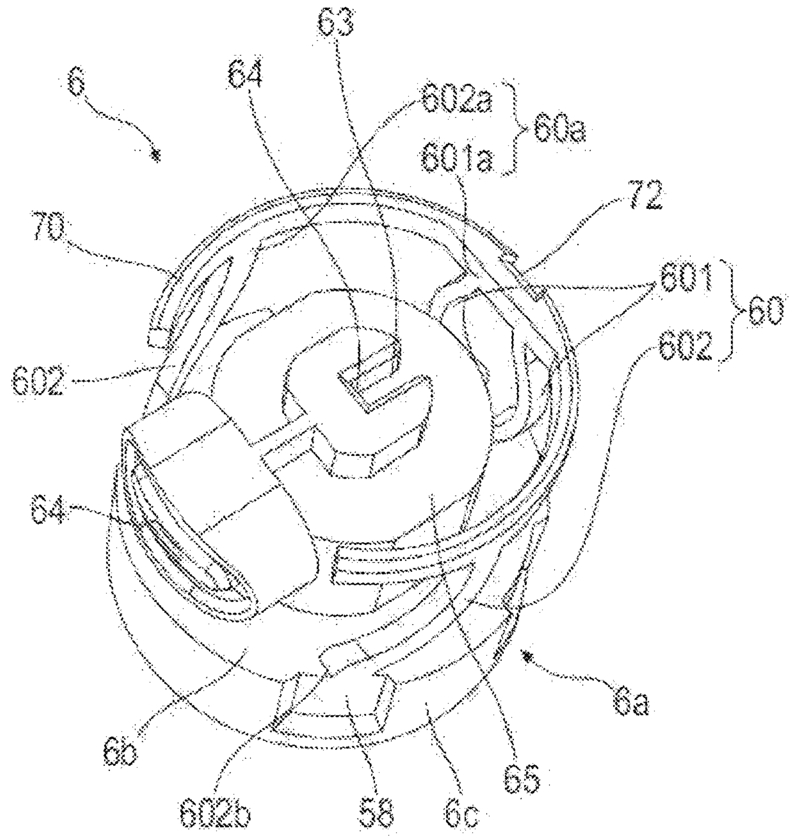
[Fig. 4b]
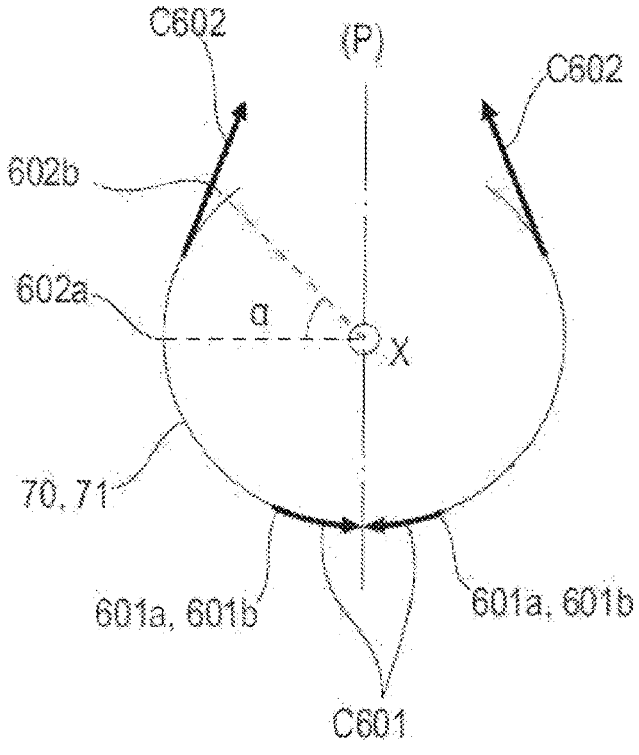

[Fig. 4c]
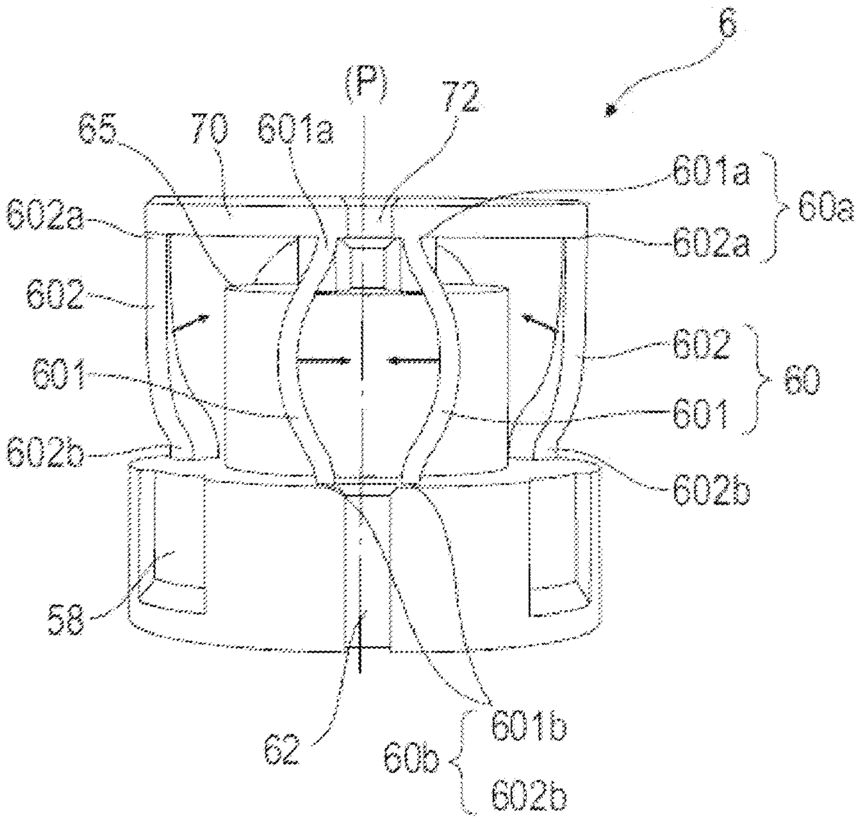
[Fig. 5a]
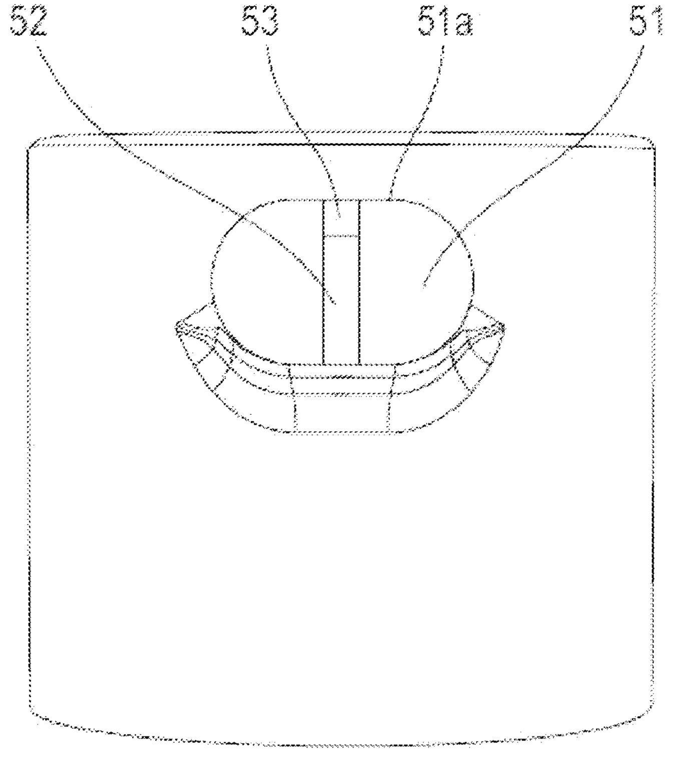

[Fig. 5b]
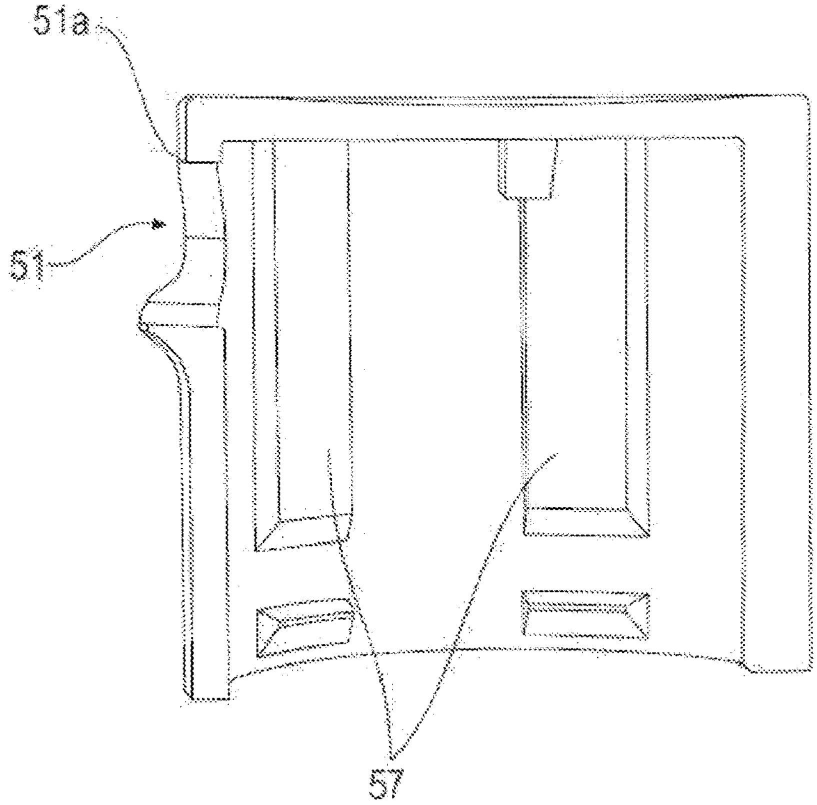
[Fig. 5c]
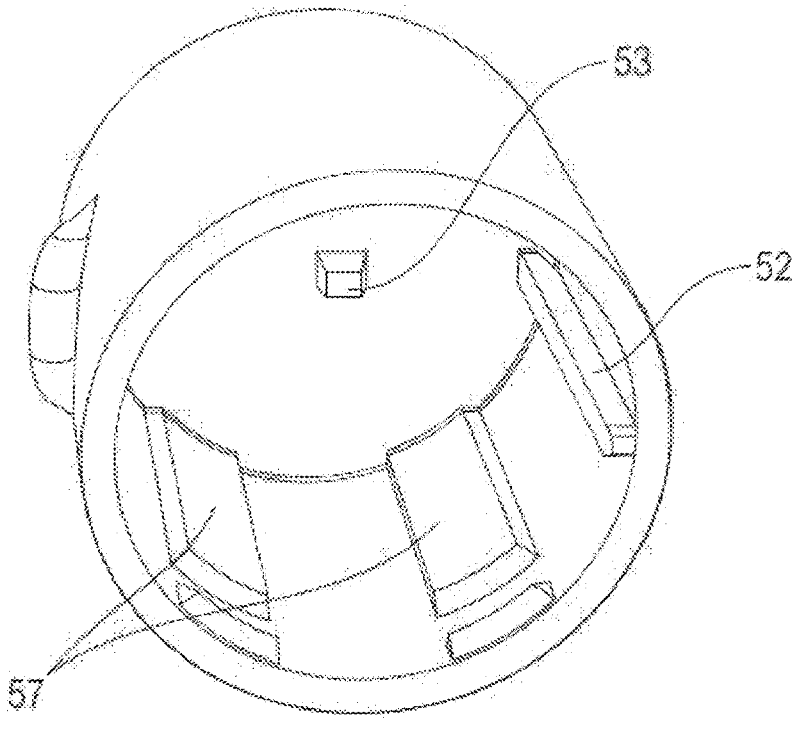

HEAD FOR DISPENSING A FLUID PRODUCT AND ASSOCIATED FLUID PRODUCT BOTTLE

TECHNICAL FIELD OF THE INVENTION

The invention relates to a dispensing head for fluid product. The invention further relates to a fluid product bottle equipped with such a dispensing head.

In the context of the invention, the fluid product can be any cosmetic product, any pharmaceutical lotion or any other product.

TECHNICAL BACKGROUND

Fluid product bottles typically include a fluid product tank topped at the top by a rigid neck delimiting an opening into which the fluid product delivery system is inserted.

The dispensing system includes a pump that can be operated by a user by means of a pusher. When the user applies pressure to the pusher, a dose of the product is dispensed through a nozzle dispensing port provided in the pusher.

Traditionally, the distribution port is permanently open. The product that remains in a communication channel between the pusher and the pump between two uses, i.e. when the pump is at rest, is therefore in contact with the external environment even before it is dispensed. It can therefore dry out or be contaminated with microbial agents.

More recently, nozzles have been proposed with a slot as a product distribution port, the opening of which depends on the pressure exerted by the product coming out of the pump.

In such a configuration, the slot cannot be perfectly sealed because it would not be possible, during the first use, to prime the pump and expel the air contained in the pump and the top from the tank. In the presence of air, the increase in air pressure resulting from the actuation of the pump is too small to open the slot so that the air could never be able to escape and the pump to be primed. Because of this watertightness, which is deliberately imperfect, such a configuration delays drying out but does not completely eliminate it.

Nozzles have also been proposed whose opening is mechanically controlled during actuation. Such nozzles are, for example, equipped with a linkage mechanism with a needle configured to obstruct the product dispensing port when the device is at rest and to perform a retracting movement when the pusher is actuated, thus allowing the fluid to be distributed through the orifice. However, this type of nozzle is more complex in design with a large number of components and therefore more expensive. In addition, this severely limits the design possibilities for the pusher.

SUMMARY OF THE INVENTION

The invention overcomes the above disadvantages and provides a fluid product dispensing head in which the nozzle opening does not depend on the pressure exerted by the product from the pump and the tank, which is simple in design, requires a limited number of components and is inexpensive. In this regard, the invention provides a fluid dispensing head, a manually operable pusher, said pusher being configured to move between a high and a low position relative to an insert, a product dispensing nozzle made of an elastic material.

The dispensing head is configured so that, when moving the pusher between the high and low position relative to the insert, the nozzle switches from a closed position in which said nozzle is sealed to an open position allowing the dispensing of said product by deformation of said nozzle under the effect of a release of a stress exerted by the pusher.

Thus, the opening of the nozzle of the invention does not depend on the pressure exerted by the product to be dispensed but on a release of a stress exerted by the pusher when moving the said pusher between the high and the low position. The nozzle can therefore be closed completely sealed, without preventing the priming. In addition, the nozzle can remain closed in a completely sealed manner, especially between two uses of the device, since the elastic material of which it is made allows it to return to its initial configuration, i.e. the rest position, after the product has been dispensed. The inside of the nozzle, as well as the product contained in the bottle, are thus protected from contamination. In addition, the nozzle according to the invention is of simple manufacture since its opening is "activated" by a simple release of a stress exerted by the pusher.

The insert is configured to exert a stress in the opposite direction of the stress exerted by the pusher to keep the nozzle closed at rest. The pusher comprises a stop, and the insert is provided with at least two deformable lugs which cause a force on the pusher so that the insert exerts a stress on the nozzle in the direction opposite to a stress exerted by the stop on the nozzle. Thus, in the resting position, the insert pushes the pusher back to the upper position thanks to the force exerted by its deformable lugs. The pusher exerts a stress on the nozzle and the insert through its stop, and on the other hand exerts a stress on the nozzle in the opposite direction. Under the effect of these two opposing stresses, the nozzle is forced into its closed position. This design reliably closes the nozzle, preventing contamination and drying of the product inside the nozzle as well as the product contained in the bottle, after product dispensing.

Also according to the invention, each lug extends from a body of the insert and has a distal end of the body, said distal ends being surmounted and connected to each other by a connecting element. As the lugs are destined to deform, the connecting element, by connecting their distal ends, makes it possible to stiffen the set of two lugs by keeping the distance between the two distal ends constant and thus to ensure a controlled deformation of each lug. This results in a more controlled movement of the pusher relative to the insert when it moves from the high position HP to the low position LP, a decrease in friction between the workpieces and finally a decrease in the actuation force by the user.

According to one method of the invention, said lugs are capable of deforming when pressure is exerted on the pusher, the stop ceasing to exert on the nozzle the stress in the opposite direction to the stress exerted by the insert, when the pusher is operated. This means that the nozzle is no longer forced into its closed position when the pusher is operated.

According to one method of the invention, the connecting element rests on the pusher. The connecting element makes a single press on the pusher, and not a plurality of contacts by said at least two lugs. While said at least two flexible lugs resting on the pusher are likely to slip and thus generate friction that would increase the actuating force of the pusher, the connecting element provides a stable support and does not slip when pressed on the pusher.

The design of the invention nozzle is therefore simple and its design possibilities are therefore varied with a limited cost.

In addition, as the fluid product is more particularly a lotion, it is desirable that it be dispensed before being compressed and/or pressurized. Indeed, the lotion can have a fragile formula that could, when put under pressure, degrade. The nozzle according to the invention allows the lotion to be protected, whatever its formula, since the opening of the said nozzle is mechanically controlled, it does not lead to pressurization.

According to different features of the invention that may be taken together or separately:

the head is configured so that, in the down position, the pusher activates the pump;

the nozzle includes a slot, the nozzle is made of elastic material, the nozzle comprises a dispensing portion provided with said slot and a duct leading to the slot, said slot is configured to deform, to allow the nozzle to switch from the closed to the open position, the dispensing head is configured so that said nozzle is subjected to opposing forces involving the pusher so as to keep the slot closed by pinching, the nozzle includes a soft veil, the said flexible veil includes the slit, a manually actuable pusher, said pusher being configured to move between a high and a low position relative to an insert, the nozzle switches from a closed position to an open position under the effect of a release of a stress exerted by the pusher, said dispensing head further comprises an insert configured to exert a directional stress opposite to the stress exerted by the pusher to keep the nozzle closed at rest, said pusher comprises a stop and said insert is provided with at least two deformable lugs, said at least two lugs causing a force on the pusher so that the insert exerts on the nozzle a stress in the opposite direction to a stress exerted by the stop on the insert, said stop is in the shape of a tongue, each lug extends from a body of the insert and has a distal end, said distal ends being surmounted and connected to each other by a connecting element, the pusher comprises a stop, the insert being provided with at least two deformable lugs, the two lugs causing a force on the pusher so that the insert exerts on the nozzle a stress in the opposite direction to a stress exerted by the stop on the nozzle, the lugs are capable of deforming when pressure is exerted on said pusher, the stop ceasing to exert on the nozzle the stress in the opposite direction to the stress exerted by the insert, when the pusher is operated, the insert is provided with at least one rear lug and at least one front lug, the rear lug being located further away from the nozzle than the front lug, the front lug has a longer resting length than the rear lug, the front lug has a greater stiffness constant than the rear lug, the insert is provided with two front and two rear lugs, the two front lugs are arranged symmetrically in relation to a plane and the two rear lugs are arranged symmetrically in relation to a plane, the dispensing head further comprises a dispensing pump fitted with a spring, said spring having a stiffness constant selected so that when the pusher is actuated, a force exerted by the lugs is less than a force exerted by the spring, the slot extends in a direction substantially transverse to a direction of travel of the pusher, said slot passes through a plane, called the plane of the slit, the direction of the stresses exerted by said stop and the said lugs being orthogonal to the plane of the slit.

the lugs are capable of deforming when pressure is exerted on the pusher, the stop ceasing to exert on the nozzle the stress in the opposite direction to the stress exerted by the insert, when the pusher is operated, the connecting element rests on the pusher, the contact between the connecting element and the pusher is a static contact, the connecting element rests on an inner face of an upper wall of the pusher, the lugs exerting stress on the pusher, the contact between the connecting element and the inner face of the upper wall of the pusher is a static contact, the connecting element is integral with the lugs, the connecting element comprises at its upper end a flat surface, the connecting element forms a ring or portion of a ring extending about an axis over an angular range greater than 30°, the connecting element forms a ring or portion of a ring extending about an axis over an angular range greater than 180°, the connecting element forms a ring or portion of a ring extending about an axis over an angular range of 270°, the connecting element forms a complete ring, the connecting element is a disk, the assembly consisting of the lugs and the connecting element has a plane of symmetry, the lugs are included in a cylinder and each has a curvature tangent to the cylinder, the connecting element is included in said cylinder, the lugs are connected to a peripheral shoulder of the insert, the insert and the pusher include means of guiding the movement of the pusher in relation to the insert, the insert and pusher include means of guiding the deformation of the lugs, the connecting element and the pusher include means of guiding the deformation of the lugs, the upper surface of the stop extends radially projecting from the pusher body and axially towards the nozzle, the angle formed by the upper surface of the stop with an outer surface of the nozzle is between 2° and 6° in the high position HP of the pusher, the pusher includes an angular stop preventing the insert from tilting, the nozzle includes a slot, said slot being configured to deform to allow the nozzle to switch from the closed to the open position, the nozzle is subjected to forces in the opposite direction involving the pusher so as to keep the slot closed by pinching.

the dispensing head comprises a dispensing pump with a spring, the spring having a stiffness constant selected so that when actuating the pusher, a force exerted by the lugs is less than a force exerted by the spring, the slot extends in a direction substantially transverse to a direction of travel of the pusher, said slot passing through a plane called the plane of the slot, the direction of the stresses exerted by said stop and the said lugs being orthogonal to the plane of the slot, a dispensing bottle for a fluid product comprising a tank in which a product is intended to be packaged and a neck equipped with a dispensing head.

The invention further relates to a dispensing bottle of a fluid product comprising a reservoir in which a product is intended to be packaged and a neck equipped with a dispensing head as described above.

BRIEF DESCRIPTION OF THE FIGURES

Other subject-matter and features of the invention will be more clearly shown in the following description, made with reference to the annexed figures, in which:

FIG. 1*a* illustrates a diametrical cross-sectional view of the dispensing head according to the invention, the pusher being in the high position;

FIG. 1*b* illustrates a diametrical cross-sectional view of the dispensing head according to the invention, the pusher being in the low position;

FIG. 2*a* illustrates an enlargement of FIG. 1*a* at the nozzle;

FIG. 2*b* illustrates an enlargement of FIG. 2*a* at the contact of the nozzle with the pusher;

FIG. 3*a* shows a front view of the nozzle;

FIG. 3*b* shows a longitudinal cross-sectional view of the nozzle;

FIG. 4*a* shows a perspective view of the insert;

FIG. 4*b* illustrates schematically the connecting element seen from above;

FIG. 4*c* shows a rear view of the insert;

FIG. 5*a* shows a front view of the pusher;

FIG. 5*b* illustrates a cross-sectional view of the pusher; and

FIG. 5*c* shows a perspective view of the pusher.

DETAILED DESCRIPTION OF THE INVENTION

With reference to FIGS. 1*a* and 1*b*, the invention relates to a dispensing head 2 of fluid product. The fluid distributed is in particular a liquid, in particular a lotion.

Said dispensing head is intended to equip a bottle, not shown, configured to contain the product to be dispensed. The bottle can be oriented either "upside down" or "upside down". Thus, the terms "superior" or "inferior" should not be considered limiting. The figures correspond to a configuration upside down.

The fluid product can be any cosmetic, pharmaceutical or any other product that can be usefully preserved in the bottle. The fluid can be in direct contact with a reservoir in the vial. That said, the fluid may be contained in a flexible pocket located within the said tank so that it is not in contact with the tank but with the said flexible pocket.

The tank can be either rigid or deformable. That being said, the tank comprises, at the level of an upper part, a neck and an opening formed in the said neck. The collar is preferably rigid.

Dispensing head 2 is preferably equipped with a dispensing pump 3.

Dispensing pump 3 comprises, in the example shown, a dosing chamber and a nozzle capable of moving inside the dosing chamber.

With reference to FIGS. 1*a* and 1*b*, a dispensing head 2 is configured so that, when moving pusher 5 between a high HP position and a low position LP, an elastic nozzle 10 switches from a closed position in which said nozzle is sealed to an open position allowing the said product to be dispensed by deformation of said nozzle 10 under the effect of a release of a stress exerted by the pusher 5. The opening of nozzle 10 is therefore mechanically controlled. Pusher 5 exerts stress on nozzle 10 when the device is at rest and it is the release of stress that allows the nozzle to switch from the closed to the open position. In this way, it promotes tightness in the closed position. The following sections describe in more detail how the stress exerted by the pusher 5 on nozzle 10 is released.

As shown in FIGS. 1*a* and 1*b*, in this embodiment, the pusher 5 comprises an outer lateral surface 50 and a stop 54 projecting from the outer lateral surface 50. Nozzle 10 is radially protruding from pusher 5. At rest, i.e. when no pressure is exerted on the pusher 5, the nozzle 10 rests at least partially on the stop 54, especially on an upper surface 54*a* of the stop (FIGS. 1*a* and 2*a*). In other words, at rest, nozzle 10 rests on the upper surface 54*a*. At the same time, this also means that stop 54 is exerting stress on nozzle 10.

In addition, the dispensing head 2 advantageously includes an insert 6. Insert 6 is made of a material that is stiffer than the material of the nozzle 10. Insert 6 exerts, at rest, on nozzle 10, a stress in the opposite direction to the stress exerted by pusher 5. This is due on the one hand to the positioning of the insert 6 in relation to the pusher 5 and the nozzle 10 and on the other hand to the configuration of the insert 6 itself.

In this connection, with reference to FIGS. 4*a* and 4*c*, insert 6 is equipped with at least two elastically deformable lugs 60. At rest, said at least two lugs 60 exert on nozzle 10 a stress in the opposite direction to the stress exerted by stop 54 of the pusher. These two opposing stresses allow nozzle 10 to be closed in a sealed manner. Indeed, as best illustrated in FIGS. 3*a* and 3*b*, nozzle 10 comprises a soft veil 15 with a slot 17 extending in a direction substantially transverse to the direction of travel of the pusher 5. In this case, slot 17 extends in a substantially horizontal manner. Thus, at rest, the stresses simultaneously exerted by the stop 54 of the pusher and by the deformable lugs 60 of the insert are balanced in order to keep the lips of the slot 17 pressed against each other. This ensures an excellent sealing of the slot. As shown in FIGS. 4*a* and 4*c*, insert 6 comprises a body 6*a* and at least two lugs 60, elastically deformable, each lug extending from a body 6*a* of the insert and having a distal end 60*a* of body 6*a*, said distal ends being surmounted and connected together by a connecting element 70.

More specifically, in the embodiment shown in FIGS. 4*a* and 4*c*, insert 6 is equipped with four elastically deformable 60 lugs. In particular, it has two front lugs 602 and two rear lugs 601, the front lugs 602 being closer to nozzle 10 than the rear lugs 601. These four lugs exert on nozzle 10 a stress in the opposite direction to the stress exerted by stop 54 of the pusher. It would be quite conceivable that the insert would only have two of the four lugs, for example, the two front lugs 602 or the two rear lugs 601. The rear lugs 601 and the front lugs 602 extend from the body 6*a* of the insert to distal ends 601*a* and 602*a* respectively, said distal ends being surmounted and connected to each other by the connecting element 70. As the lugs are destined to deform, the connecting element 70, by linking their distal ends, makes it possible to stiffen all the lugs by keeping the distance between the distal ends constant and thus to ensure a controlled deformation of each front lug 602 and rear lug 601. This results in a more controlled movement of the pusher 5 relative to insert 6 when it moves from the high position HP to the low position LP, a decrease in the friction of the workpieces and finally a decrease in the actuation force by the user.

In another embodiment not shown, insert 6 consists of only two lugs connected by the connecting element. According to another embodiment not shown, insert 6 comprises four deformable lugs 60, only two of which are connected by the connecting element. According to another embodiment not shown, insert 6 comprises four deformable lugs connected two by two by a first and a second connecting element.

As shown in FIG. 1*b*, the lugs 60 are capable of deforming when pressure is exerted on said pusher 5, said stop 54 then ceasing to exert on nozzle 10 the stress in the opposite direction to the stress exerted by insert 6, when actuating pusher 5. When the user applies pressure to the pusher, i.e. presses on an external surface of an upper wall 56 of the pusher 5, the pusher 5 moves to the low position LP. The lugs 60 deform elastically so that the top wall 56 of the pusher 5 comes closer to the insert 6. Nozzle 10 thus detaches from stop 54, in particular from its upper surface 54*a*, and slot 17 opens, without the stresses that have now disappeared. Her lips are no longer pressed against each other.

As shown in FIGS. 1*a* and 1*b*, the connecting element 70 rests on the pusher 5, in particular on the inner face of the upper wall 56 of said pusher 5, the lugs exerting stress on said pusher. This is because the lugs 60 transmit the stress to the connecting element 70, which in turn transmits the stress to the pusher 5. Thus, the contact between insert 6 and pusher 5 is made by the connecting element 70, which extends at least the distance between two lugs. The contact between the insert and the pusher is therefore more stable than if it consisted only of a plurality of contact points, in this case between the distal ends 60*a* of the lugs 60 and the pusher 5 in the absence of a connecting element. In particular, according to the embodiment of insert 6 shown in FIGS. 4*a* and 4*c*, during the deformation of the front lugs 602 and the rear lugs 601, when the pusher 5 moves in the direction of the insert 6 from the high position HP to the low position LP, the contact points of the lugs on the pusher 5 would move on the inner face of the upper wall 56 in the absence of the connecting element 70. These dynamic contacts would generate friction and consequently an increase in the force required to operate the pusher 5. On the contrary, the connecting element 70 remains stationary in relation to the inner face of the upper wall 56 of the pusher 5. The contact between the connecting element 70 and the inner face of the wall 56 of the pusher 5 is a static contact that does not generate any friction.

Advantageously, the connecting element 70 has a flat surface at its upper end. The contact between the connecting element 70 and the inner face of the upper wall 56 is therefore a plane-to-plane contact, which is more stable and generates less friction than a contact of an edge on a plane. Finally, since the stress is transmitted from lugs 60 to connecting element 70, which in turn transmits said stress to pusher 5, in particular to the inner face of the upper wall 56, connecting element 70, by virtue of its extent, transmits a homogeneous stress to pusher 5. This allows for a balanced distribution of the stresses exerted on the pusher 5.

The connecting element 70 is integral with the at least 60 deformable lugs. In particular, as shown in FIGS. 4*a* and 4*c*, the connecting element 70 is integral with the two front lugs 602 and the two rear lugs 601. The production of the part is thus facilitated and the cost of manufacturing per injection is thus minimized.

The connecting element 70 forms a portion of a ring extending around an axis (X) over an angular range preferentially greater than 30°. In the embodiment shown in FIGS. 4*a* to 4*c*, the ring portion extends over a range of 270° and connects the two front lugs 602 and the two rear lugs 601. In an embodiment not shown, the connecting element 70 connects only the two rear lugs 601 by forming a portion of a ring over an angular range of more than 30°. Preferably, the ring extends over an angular range of more than 180°. In an embodiment not shown, the connecting element 70 forms a complete ring, i.e. 360°.

In an alternative embodiment not shown, the connecting element 70 is a disc, which allows for stable and low-friction contact with the part with which the disc cooperates, in particular with the inner face of the upper wall 56 of pusher 5.

The user is likely to press off-center on the top wall 56 of the pusher 5 when it is operated. Therefore, in order to ensure that the pusher moves without friction or malfunction from the high position HP to the low position LP of the pusher, it is desirable that the assembly consisting of at least two lugs 60 and the connecting element 70 be symmetrical according to the plane of symmetry (P), as shown in FIGS. 4*b* and 4*c*. The insert as a whole can also be symmetrical according to the plane (P). Thus, as shown in FIGS. 4*a* and 4*c*, the two rear lugs 601 are symmetrical with respect to the plane of symmetry (P), as well as the two front lugs 602 and have a curvature C601 and C602 respectively. The C602 bends of the 602 front lugs are oriented substantially towards the front of insert 6, i.e. in the direction of nozzle 10. These two C602 curvatures are symmetrical to each other. The two rear lugs 601 located at the rear of insert 6, i.e. opposite nozzle 10, are also symmetrically arranged and their curvatures C601 are oriented substantially towards each other and are substantially orthogonal to the plane of symmetry (P).

Said at least two lugs 60 shall be connected to a peripheral shoulder 6*b* of said insert 6. They are included in a cylinder 71 and each has a curvature tangent to said cylinder 71 (FIG. 4*b*). Connecting element 70 is also included in said cylinder 71. This geometry facilitates the definition and fine-tuning of the injection tool. In particular, as shown in FIGS. 4*a* and 4*c*, the shoulder 6*b* of insert 6 has a substantially horizontal surface orthogonal to the X-axis and is located on the periphery of the insert. It is bordered by an outer skirt 6*c* of the insert. The lugs 60 are connected to the shoulder 6*b* by the connection points 60*b*. Specifically, with reference to FIGS. 4*a* and 4*c*, the front lugs 602 and the rear lugs 601 are connected to the peripheral shoulder 6*b* at the connection points 602*b* and 601*b* respectively. Thus, the lugs 60, both the front lugs 602 and the rear lugs 601, are themselves located on the periphery of the insert. Since the lugs 60 are not radially located between the body 6*a* of the insert and any structure of the insert on the periphery, the lugs and therefore the entire insert are easy to unmold with a drawer mold and it is not necessary to use a mold with spindle crossovers, which is more expensive and complicated to develop.

The distal ends 60*a* of the lugs 60 are connected, as described above, to the connecting element 70. The connection point 601*b* to the body 6*b* of the insert 6 and the distal end 601*a* of each rear lug 601 are vertical to each other. In other words, the line joining these two points is parallel to the axis (X) (FIGS. 4*b* and 4*c*). However, the connection point 602*b* and the distal end 602*a* of each front lug 602 are not vertical to each other. The distal end 602*b* is offset by 30° from the connection point 602*a*, with the angle measured relative to the axis (X). An angle between 5° and 50°, preferably between 20° and 40°, is also possible.

The front lugs 602 are closer to nozzle 10 than the rear lugs 601 and therefore contribute more to the closure of nozzle 10. It is therefore important that the front lugs 602 have a reliable, repeatable operation that does not deteriorate with repeated actuation and that suffers little from ageing. For this reason, it is advantageous that the front lugs 602, when moving the pusher 5 from the high position HP to the low position LP, operate in a range of elastic deformation far from their yield strength, beyond which they would deform irreversibly. Thus, it is advantageous to angularly offset the distal parts 602*a* and the connection points 602*b* of each front lug 602, in order to increase its length at rest and therefore the yield strength of the said front lug 602.

As an alternative, it is possible to have a single front lug 602 and a single rear lug 601. Thus, insert 6 is provided with at least one rear lug 601 and at least one front lug 602, closer to nozzle 10 than said at least one rear lug 601, said at least one front lug 602 having a length at rest greater than said at least one rear lug 601.

The front lugs 602 have a higher stiffness constant than that of the rear lugs 601. This characteristic can be achieved, for example, with a thickness of the front lugs 602 that is greater than that of the rear lugs 601. Thus, the stress exerted by the front lugs 602 on the pusher 5 is greater than that exerted by the rear lugs 601. The resulting force torque causes the insert to tilt relative to the pusher in the direction indicated by an arrow in FIG. 1*a*, favoring the nozzle to make contact with pusher 5, i.e., stop 54.

As an alternative, it is possible to have a single front lug 602 and a single rear lug 601. Thus, insert 6 is provided with at least one rear lug 601 and at least one front lug 602, closer to nozzle 10 than said at least one rear lug 601, said at least one front lug 602 having a stiffness constant greater than said at least one rear lug 601.

In FIG. 2*a*, we can still see that insert 6 includes an opening 64 receiving nozzle 10, here radially. Opening 64 more precisely receives a portion 19 of nozzle connection (visible in FIG. 3*b*). It includes fixing means 19A cooperating with fixing means 64*a* of the insert, which ensures a correct positioning of the nozzle 10. Insert 6 also includes a chimney 63 with a substantially cylindrical shape, the internal dimensions of which are adapted to those of an upper portion of the distribution pump 3 in order to accommodate the said upper portion of the pump. Chimney 63 is oriented along the actuation axis of the dispensing head.

Pusher 5 has an opening 51 for the passage of nozzle 10. A diameter of the opening 51 is such that in the high position HP of the pusher, a clearance J between the nozzle 10 and an upper edge 51*a* of the opening 51 (FIGS. 1*a* and 2*a*) is greater than the axial displacement length of the pusher 5 between the high position HP and the low position LP. Thus, there is a clearance J' between nozzle 10 and the upper edge 51*a* of the opening 51 when the pusher 5 is in the down position LP. Thus, in the low position LP, the nozzle tip 10 is not subjected to any stress and in particular the pusher 5 does not interfere with the opening of the slot 17 for the dispensing of the product.

As shown in FIGS. 2*a* and 2*b*, the upper surface 54*a* of stop 54 extends radially projecting from the body 50 of pusher 5 and axially towards nozzle 10. The upper surface 54*a* of stop 54, in the vicinity of its peripheral radial end, is oriented towards the nozzle, i.e. upwards, so that the stress exerted by the upper surface 54*a* of stop 54 is exerted in the vicinity of said slot 17 of nozzle 10. In order for the contact between nozzle 10 and stop 54 to effectively close slot 17 of the nozzle, it is preferable that the stress be precisely located at a point 55 on the side of nozzle 10 where slot 17 is located. The angle thus formed by the upper surface 54*a* of the stop 54 with an outer surface of the nozzle opposite the stop is between 2° and 6°, preferably 4°, in the high position HP of the pusher.

Also preferably, insert 6 and pusher 5 include guiding means 57,58 of the displacement of pusher 5 compared to insert 6. As shown in FIGS. 4*c* and 5*c*, the pusher 5 includes ribs 57 for angular positioning of insert 6. Said ribs extend from the inner side flanks of pusher 5 and cooperate with axially oriented grooves 58 at the level of an external face of the peripheral wall of said insert 6. Said ribs 57 and grooves 58 allow the guiding of insert 6 in relation to pusher 5 during their relative axial movement.

Also preferably, insert 6 and pusher 5 include lugs deformation guiding means 52,62,72. The insert body 6*a*, the connecting element 70 and the pusher 5 include lug deformation guiding means 52,62,72. Pusher 5 comprises a secondary rib 52 which extends along an inner face of pusher 5 and cooperates with an axially oriented secondary groove 72 provided at an external face of connecting element 70 of said insert 6. Insert body 6*a* includes an additional groove 62 in the axial extension of the secondary groove 72 of the connecting element. Thus, the secondary rib 52 of the pusher 5 cooperates with the additional groove 62, which allows a guide of the pusher 5 with respect to insert 6 and the cooperation between said secondary rib 52 and said secondary groove 72 of the connecting element 7 allows a guide of the connecting element 70 with respect to the pusher 5, that is to say, a guide to the deformation of the lugs 60. Thus, that connecting element 70 includes guidance means 72. The said secondary rib 52 and the said secondary groove 72 are located at the rear of the dispensing head 2, opposite nozzle 10. In an embodiment not shown, the means of guiding the deformation of the lugs 60 do not include the additional groove 62 carried by the body 6*a* of the insert 6 and only the secondary groove 72 and the secondary rib 72.

Also preferably, the pusher 5 includes an angular stop 53 preventing the insert 6 from tilting. Thanks to this angular stop 53, a tilting of the insert when in the high position HP of the pusher removing the nozzle 10 away from the pusher 5, in this case away from the upper surface 54*a* of the stop 54, is prevented. Such a tilting of insert 4 relative to pusher 5 would result in pusher 5 not exerting sufficient stress on nozzle 10 to ensure a tight closure of nozzle slot 17, or even in nozzle 10 losing contact with surface 54*a* of stop 54 when pusher 5 is in the high position HP. To remedy this disadvantage, the inner face of the upper wall 56 of the pusher is provided with a pin 53, as shown in FIGS. 1*a*, 1*b* and 5*a* to 5*c*. Insert 6 is provided on an upper face 65 with a slide 63, in which the pawn 53 is guided, the cooperation of the slider 63 and the pawn 53 guiding the pusher 5 as it moves relative to the insert 6 when moving the pusher. The slider 63 includes a wall 64 along which the pawn 53 slides when the pusher 5 is moved. Thus, the sliding contact between an edge 53*a* of the pin 53 of the pusher 5 and the wall 64 of the slider 63 of the insert 6 guides the movement of the pusher while ensuring in the high position HP of the pusher that insert 6 is angularly oriented relative to pusher 5 so that nozzle 10 is pressed against the upper surface 54*a* of the stop 54 of the pusher 5. The pin 53 thus acts as an angular stop for the insert.

It should be noted that the deformation of the lugs 60 and the deactivation of the stress(es) exerted by the said lugs is also due to the fact that their stiffness constant is appropriately selected in relation to a spring 35 of the pump 3. This is because the pump spring 35 has a stiffness constant chosen so that, when the pusher 5 is actuated, the force exerted by the lugs 60 is less than the force exerted by the pump spring 35. At rest, as no stress is exerted on the pusher 5 and the pump is stopped, the insert 6, via lugs 60, exerts a downward stress on the nozzle 10 while the stop 54 exerts an upward stress, in the manner of a pinch. On the other hand, when actuating the pusher 5, the force exerted by said pump spring 35 is greater than that exerted by the lugs 60 and the insert 6 approaches the inner face of the upper wall 56 of the pusher 5. At the same time, the pump spring 35 has an appropriate stiffness to maintain its ability to compress and to allow the pump 3 to be operated in order to distribute the product, once slot 17 is opened.

In any case, by ceasing to press the pusher 5, the insert 6 returns to its original configuration, which allows the nozzle 10 to be closed mechanically. The opening and closing of nozzle 10, in particular slot 17, does not depend on the pressure exerted by the fluid but on the mechanical stresses exerted or not on nozzle 10.

When the nozzle 10 is detached from the stop 54, the detachment remaining light, the tightness is favoured by the shape of the nozzle 10, which is intended to extend on the surface at the front of the stop 54, under slot 17.

The configurations shown in the figures cited are only possible examples, by no means limiting, of the invention which, on the contrary, encompasses the variants of forms and conceptions within the reach of the man of art.

The invention claimed is:

1. A dispensing head comprising:

a manually actuable pusher configured to move between a high position (HP) and a low position (LP) relative to an insert, a product dispensing nozzle comprising an elastic material, wherein, when moving the pusher from the high position (HP) to the low position (LP), the product dispensing nozzle switches from a closed position in which said product dispensing nozzle is sealed to an open position allowing the dispensing of a product by deformation of said product dispensing nozzle because of a release of a stress exerted by the pusher, said insert configured to exert a stress in an opposite direction of the stress exerted by the pusher on the product dispensing nozzle to keep the product dispensing nozzle closed at rest, said pusher comprising a stop and said insert comprising at least two deformable lugs, wherein said at least two lugs exert a force on the pusher such that the insert exerts a stress on the product dispensing nozzle in an opposite direction to a stress exerted by the stop on the product dispensing nozzle, each of said at least two lugs extending from a body of the insert and each having a distal end surmounted and connected to each other by a connecting element.

2. The dispensing head of claim 1, wherein the lugs deform when pressure is exerted on said pusher.

3. The dispensing head of claim 1, wherein said at least two deformable lugs comprise:

at least one rear lug; and at least one front lug, wherein the at least one front lug is closer to the nozzle than the at least one rear lug.

4. The dispensing head of claim 3, wherein the at least one front lug has a length at rest that is greater than a length at rest of the at least one rear lug.

5. The dispensing head of claim 3, wherein the at least one front lug has a stiffness constant that is greater than a stiffness constant of the at least one rear lug.

6. The dispensing head of claim 1, wherein the connecting element is integral with said at least two lugs.

7. The dispensing head of claim 1, wherein the connecting element rests on the pusher.

8. The dispensing head of claim 1, wherein the connecting element comprises a portion of a ring extending about an axis (X) over an angular range greater than 30°.

9. The dispensing head of claim 1, wherein the connecting element is a disk.

10. The dispensing head of claim 1, wherein the at least two lugs and the connecting element form an assembly having a plane of symmetry (P).

11. The dispensing head of claim 10, wherein the at least two lugs are included in a cylinder.

12. The dispensing head of claim 1, wherein the at least two lugs are connected a a peripheral shoulder of said insert.

13. The dispensing head of claim 1, wherein the insert includes at least one groove and the pusher includes at least one rib, wherein the at least one rib is positioned in the at least one groove to guide the displacement of the pusher with respect to the insert.

14. The dispensing head of claim 1, wherein the pusher includes a secondary rib extending along an inner face of the pusher and which cooperates with an axially oriented secondary groove in an external face of the insert.

15. The dispensing head of claim 1, wherein the pusher further comprises an angular stop preventing a tilting of the insert.

16. The dispensing head of claim 1, wherein said nozzle comprises a slot configured to deform between an open position and a closed position.

17. The dispensing head of claim 16, wherein the slot extends in a direction substantially transverse to a direction of travel of the pusher.

* * * * *